(12) United States Patent
McEwan

(10) Patent No.: US 6,452,467 B1
(45) Date of Patent: Sep. 17, 2002

(54) MATERIAL LEVEL SENSOR HAVING A WIRE-HORN LAUNCHER

(75) Inventor: Thomas E. McEwan, Carmel Highlands, CA (US)

(73) Assignee: McEwan Technologies, LLC, Monterey, CA (US)

( * ) Notice: Subject to any disclaimer, the term of this patent is extended or adjusted under 35 U.S.C. 154(b) by 0 days.

(21) Appl. No.: 09/282,962

(22) Filed: Apr. 1, 1999

(51) Int. Cl.[7] .................................................. H01P 3/16
(52) U.S. Cl. ........................ 333/240; 333/34; 73/290 R
(58) Field of Search ................................. 333/240, 236, 333/34; 73/290 R

(56) References Cited

U.S. PATENT DOCUMENTS

| | | | | |
|---|---|---|---|---|
| 2,685,068 A | * | 7/1954 | Goubau | 333/240 |
| 2,971,170 A | * | 2/1961 | Hafner | 333/240 X |
| 3,683,299 A | * | 8/1972 | Vzyatshev et al. | 333/240 |
| 3,695,107 A | | 10/1972 | Hertz et al. | 73/290 R |
| 3,703,829 A | | 11/1972 | Dougherty | 73/290 R |
| 3,812,422 A | | 5/1974 | De Carolis | |
| 3,832,900 A | | 9/1974 | Ross | 73/290 R |
| 3,874,237 A | | 4/1975 | Zwarts | 73/290 R |
| 3,995,212 A | | 11/1976 | Ross | 73/290 RY |
| 4,188,595 A | * | 2/1980 | Cronson et al. | 333/240 X |
| 4,359,902 A | | 11/1982 | Lawless | 73/290 R |
| 4,489,601 A | | 12/1984 | Rao et al. | 73/290 R |
| 5,457,990 A | | 10/1995 | Oswald et al. | 73/290 |
| 5,565,774 A | | 10/1996 | Dudding et al. | |
| 5,609,059 A | | 3/1997 | McEwan | 73/290 R |
| 5,610,611 A | | 3/1997 | McEwan | 342/89 |
| 5,651,286 A | | 7/1997 | Champion et al. | 73/290 V |
| 5,726,578 A | | 3/1998 | Hook | 324/643 |

* cited by examiner

*Primary Examiner*—Benny Lee
(74) *Attorney, Agent, or Firm*—Mark A. Haynes; Haynes Beffel & Wolfeld LLP

(57) ABSTRACT

A single-wire time-domain reflectometer (TDR) combines the best performance features of prior art "electronic dipsticks" in a high accuracy implementation that allows tank penetration though a small opening. A wire-horn structure is employed to launch TDR pulses onto a single wire transmission line, wherein the horn wires can be flexed inwards so the dipstick structure can be inserted through a small tank opening. Once inside the tank, the horn wires flex to their normal state to provide a controlled reference reflection while simultaneously providing high coupling efficiency to the dipstick. The TDR system determines the fill-level of a tank by measuring the time difference between a reflection created at the wire-horn, which all is at the top of a tank, and a reflection from a material in the tank. The TDR employs automatic time-of-peak (TOP) detectors and incorporates a 2-diode sampler, a low-aberration pulse generator, and a 0.001% accurate timebase.

5 Claims, 9 Drawing Sheets

MATERIAL LEVEL SENSOR HAVING A WIRE-HORN LAUNCHER

BACKGROUND OF THE INVENTION

1. Field of the Invention

The present invention relates to pulsed electromagnetic sensors, and more particularly to fluid and material level sensors using time-domain reflectometry (TDR). These sensors can be used for determining or controlling the fill-level of a tank, vat, irrigation ditch, silo, pile,. or conveyor. Also, the present invention can be used as a linear displacement transducer for use in machine control.

2. Description of Related Art

TDR techniques have been used in the past for measuring the fill-level in a tank. For example, U.S. Pat. No. 3,703,829, Liquid Quantity Gaging System, to Dougherty discloses a time-domain reflectometer (TDR) connected to a coaxial cable, or probe, immersed in a liquid, wherein the time delay of the reflected pulse is a measure of the liquid level in the coaxial probe. The key advantages to coaxial TDR probes are (1) strong reflection amplitudes, which are of particular advantage with low dielectric constant materials, and (2) stilling action, wherein sloshing is less pronounced inside the coaxial probe so steadier measurements can be obtained. On the negative side, coaxial probes are (1) mechanically difficult to fabricate with adequate precision, particularly concerning the centering and support of the open-air center conductor, (2) difficult to cut in custom lengths in the field, (3) difficult to ship in long sections, (4) difficult to join in short segments, (5) susceptible to blockage, and (6) difficult to make flexible for coiling during shipping.

A single wire transmission line, or Goubau line, overcomes most of the limitations to the coaxial probe and has been disclosed in U.S. Pat. No. 3,995,212, Apparatus and Method for Sensing a Liquid with a Single Wire Transmission Line, to Ross and U.S. Pat. No. 5,609,059, Electronic Multi-purpose Material Level Sensor, to McEwan. The key advantages to a single wire TDR probe for material level sensing are (1) extreme simplicity, (2) ability to coil the line for shipping (when made of wire), (3) simple custom cutting to length in the field, (4) nearly complete freedom from clogging (material can cling to the line, but generally has little effect), and (5) low cost.

A single wire probe requires a means to launch a TDR pulse onto the wire. A horn launcher, as described by Ross, exhibits high launching efficiency and provides a smooth impedance transition between the TDR unit and the high impedance of the single wire transmission line. However, the horn has notable disadvantages: (1) there is an impedance discontinuity that extends along the length of the horn that casts a distributed reflection and creates a potential measurement error, (2) there is no definite reflection to provide a "top-of-tank" reference marker, (3) the horn ends too abruptly at its rim which creates a spurious reflection in the measurement range, (4) the horn is physically large and expensive, and (5) a large opening is needed to insert the horn through, often requiring a large, and therefore expensive, ANSI-rated tank cover.

(ANSI is the American National Standards Institute.)

A flat plate-type launcher, as described by McEwan in U.S. Pat. No. 5,609,059, creates a strong reflection to indicate the top of the tank, is mechanically simple, and does not require a large tank opening. Its primary disadvantages are (1) the launch point reflection is often too strong, creating pulse aberrations that extend into the measurement range, (2) it has a low launch efficiency relative to the horn, which results in excessively low signal returns from low dielectric constant materials, (3) due to its low launch efficiency, a hot ground condition exists that can propagate pulses backwards onto the outside of the TDR feed cable, creating spurious reflections and ringing.

A launcher is needed that combines the best performance features of both the horn and the plate with none of the drawbacks: good coupling efficiency, a controlled-amplitude marker reflection, absence of hot grounds, insertable through a small opening, and low cost.

Regardless of whether a coaxial or single wire line is used, it is most desirable to process the reflected pulses with automatic pulse detection techniques that render the measurement independent of pulse amplitude. McEwan, in U.S. Pat No. 5,610,611, High Accuracy Material Level Sensor, discloses a constant fraction discriminator, or CFD, that incorporates a peak detector to automatically set the trigger point on its pulse detectors. While this method eliminates pulse amplitude dependence, it suffers from dynamic errors that can arise in sloshing tanks. The dynamic errors arise from the inability of the peak detector to track rapid decreases in repetitive pulse amplitude. A new automatic pulse detector is needed, and preferably one which also rejects errors caused by low-frequency aberrations in the return signal.

Generally, the accuracy of commercial TDR-based material level sensors is on the order of 1%. In order to improve accuracy, the TDR timing system would need a stability on the order of a few picoseconds over time and temperature. Thus, a very precise pulse detection and timing system is needed that is not available in the prior art.

SUMMARY OF THE INVENTION

The present invention is a time domain reflectometer (TDR) having a single wire transmission line which is inserted into a tank or container, wherein the round trip travel time of reflected pulses indicates the location or, equivalently, the fill-level of the tank. Accurate measurements are made by measuring the difference in reflection times between a reflection at the top of the tank (designated T herein) and a reflection from the material in the tank (designated M herein). This T–M time difference is independent of interconnect cable lengths and propagation delays in the TDR apparatus. Consequently, accurate, stable measurements are possible at the picosecond level. The present invention is also a number of individual components used in the TDR.

In order to launch a pulse onto a single wire transmission line, a pulse launcher is needed, such as a coaxial horn or a well-grounded metal plate as used in the prior art. The present invention advantageously employs a sparse, open horn formed of several wires or leaves in place of the prior art pulse launchers to (1) provide a sharp, controlled-impedance discontinuity and thus a sharp, controlled-amplitude reflection, (2) efficiently launch a pulse onto the line, and (3) provide a smooth transition from the horn to free space to avoid spurious reflections at the horn rim.

An efficient pulse launcher, as provided by the present invention, virtually eliminates a hot ground effect commonly seen with plate-type launchers. With the open-wire horn, TDR pulses are partially reflected back to the TDR apparatus and partially transmitted onto the dipstick, and very little propagates backwards over the outside of the wire horn launcher and onto the outer jacket of the feed coaxial wire. Were this to occur, ringing and spurious reflections can usually be observed in combination with the desired reflections, making accurate measurements impossible.

Mechanically, the wire horn is simple, robust, and inexpensive. Notably, its wires can be bent inwards, in a similar fashion to folding an umbrella, so it can be inserted through a small tank opening such as a ½" threaded pipe opening. This feature greatly expands the range of applications for the present invention, such as for monitoring the oil level in standard 200 gallon heating oil tanks used throughout the northern U.S., which are commonly fitted with several top-side pipe-threaded openings.

In the present invention, a squarewave pulse is transmitted by the TDR apparatus and the return reflections are differentiated into impulses and subsequently sampled to produce an equivalent time (ET) video signal that is an exact replica of the realtime pulses, except on a vastly expanded time scale. Equivalent time techniques convert nanosecond events to millisecond events for vastly simplified processing.

The present invention includes a novel low aberration TDR pulse generator having one sharp edge used for measurement, and one slow, return-to-zero edge that has no effect on the system. In addition, a novel TDR circuit is employed to convert the transmitted TDR squarewaves to sharp impulses for accurate, time-of-peak measurement. As a further feature, a novel 2-diode sampler with extremely low line loading and blowby is utilized.

Amplitude-gated time-of-peak (TOP) detectors are employed to accurately detect reflected pulses and trigger timing counters. The TOP detectors are independent of pulse amplitude, and are accordingly independent of material dielectric constants, pulse risetime, pulse amplitude, manufacturing variations, long-term drift, and low frequency ringing.

In one embodiment, the accuracy of the system is further improved with a unique two-frequency, crystal-controlled timing system that yields scale-factor stabilities limited by the accuracy of a quartz crystal, which is typically ~0.001%. Alternatively, the quartz crystal may be replaced with a temperature compensated crystal oscillator (TCXO), an ovenized crystal oscillator, or an atomic clock, all of which can provide stabilities well below 1 ppm/° C.

The present invention can be used as an electronic dipstick for innumerable applications in material level sensing in containers. In combination with a valve, it can be used to control or automatically regulate the level in a toilet tank, for example. In a totally different application, it can sense the presence and location of an object in contact (or near contact) with its Goubau line, such as a security wire around a window. As a linear displacement transducer, where a moveable reflecting object slides along the Goubau line, vehicle height can be sensed or hydraulic cylinder displacement can be measured for safety or automatic control.

BRIEF DESCRIPTION OF THE DRAWINGS

FIG. 3b is a reflection waveform to a stepped pulse for the configuration of FIG. 3a.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. Patents and copending U.S. applications cited herein are herein incorporated by reference.

The same elements or features have the same numbers or labels in the various figures. Illustrative waveforms are shown at some locations in the system/circuit diagrams.

Figure 1:
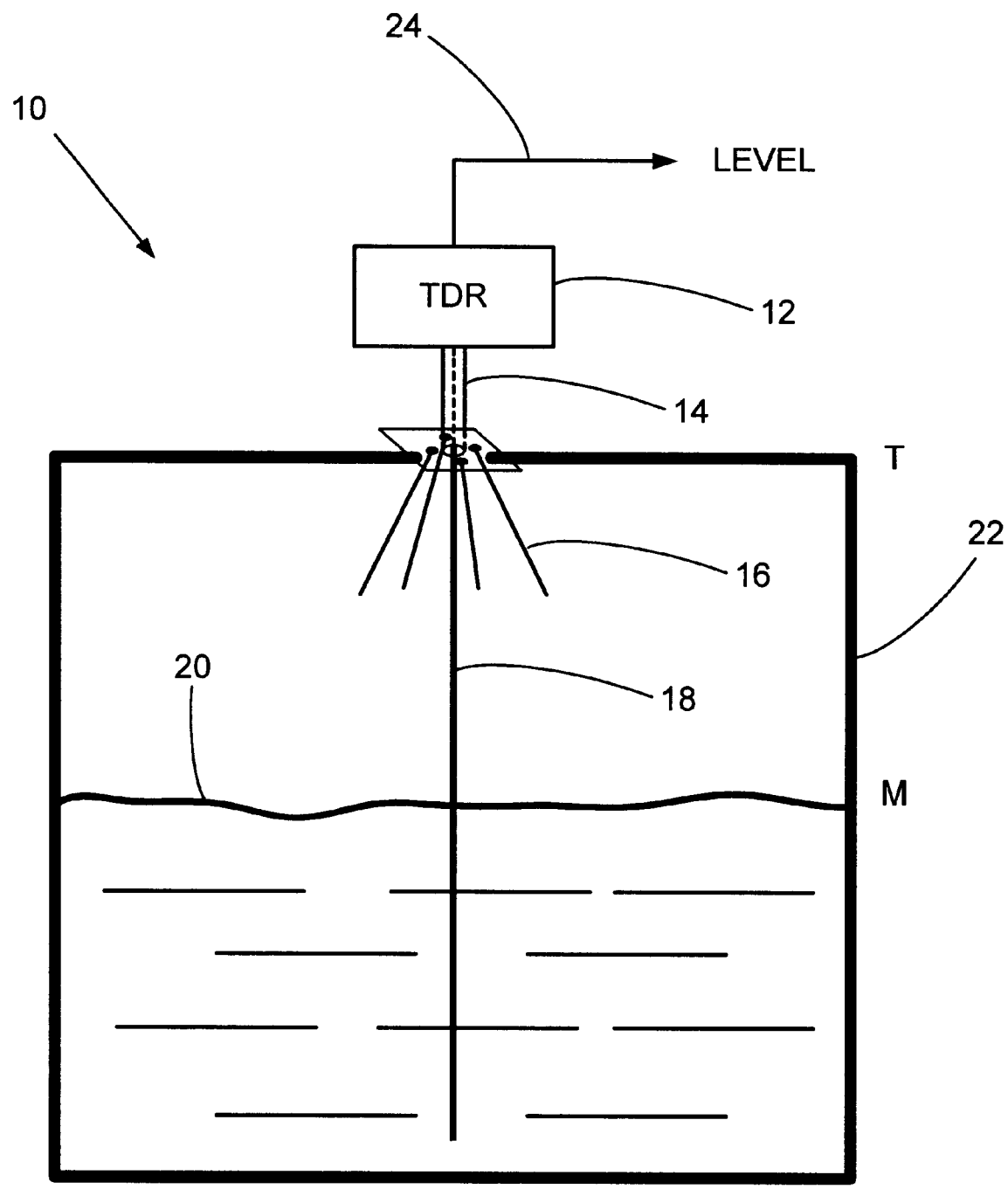
FIG. 1 is a diagram of a single wire tank level sensor with a wire launch horn of the present invention.

FIG. 1 is an overview of a single wire material level sensor 10 of the present invention. A time domain reflectometer (TDR) transceiver unit 12 transmits pulses down a coaxial cable 14 to an attached launcher horn 16 comprised of several wires forming a horn shape. The launcher horn facilitates the propagation of electromagnetic waves (EM) that propagate down an attached single wire transmission line 18, also known as a Goubau line, or herein, a dipstick. When the propagating pulses encounter a material 20, some or all of the pulse energy is reflected back up the dipstick and into the TDR unit 12. The TDR unit 12 processes the round trip time to provide a range or fill-level indication 24. The launcher horn 16 is configured to provide a pulse reflection marking the top of the tank 22, labeled T. Accordingly, the TDR unit 12 measures the difference in reflection time between a reflection at T and reflection at M, the material level. The time difference T–M is independent of propagation delays along coaxial cable 14 or apparatus delays within the TDR unit 12. Thus, an accurate fill-level can be obtained with a timing stability limited, in principle, solely by the mechanical stability of the tank.

Figure 2A:
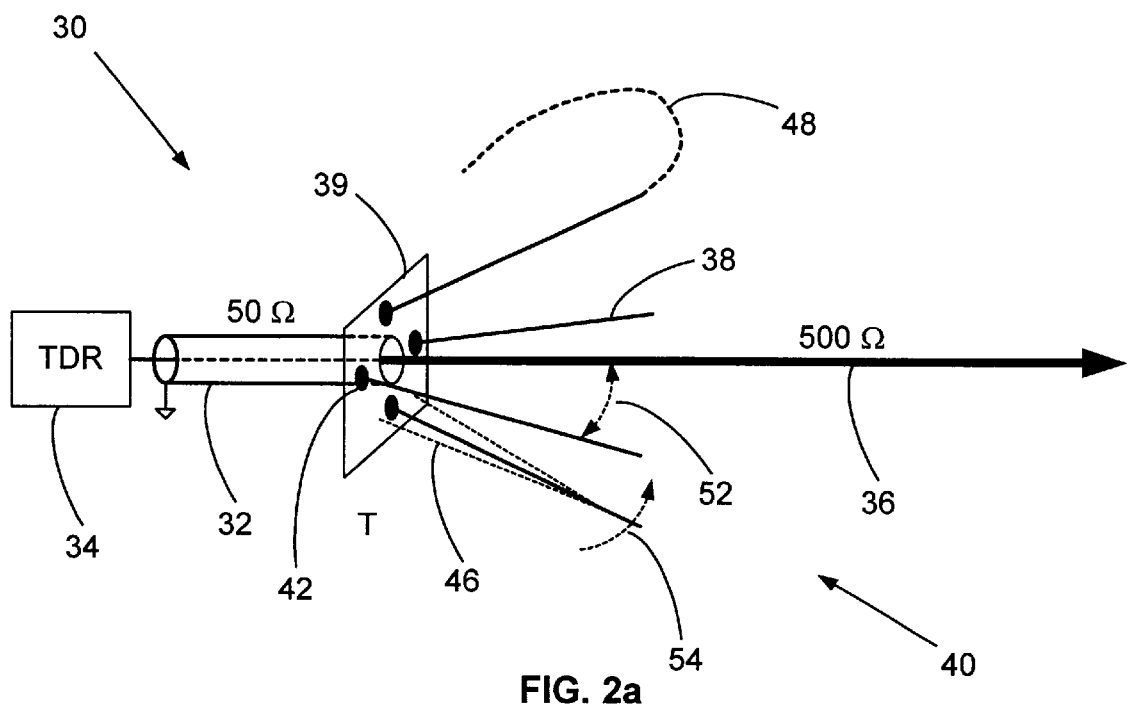
FIG. 2a depicts the wire horn and associated transmission lines of the present invention.

FIG. 2a depicts the entire dipstick assembly 30, which is comprised of a coaxial cable 32 to interconnect a TDR unit 34 to dipstick rod or wire 36. A pulse launcher 40 is comprised of wires 38 arranged symmetrically about the dipstick rod or wire 36 and extending outwardly to approximate a horn shape. The horn wires are supported by a small metal plate 39 which is in metallic (i.e. electrical) contact with the shield of cable 32 and the horn wires 38.

Figure 2B:
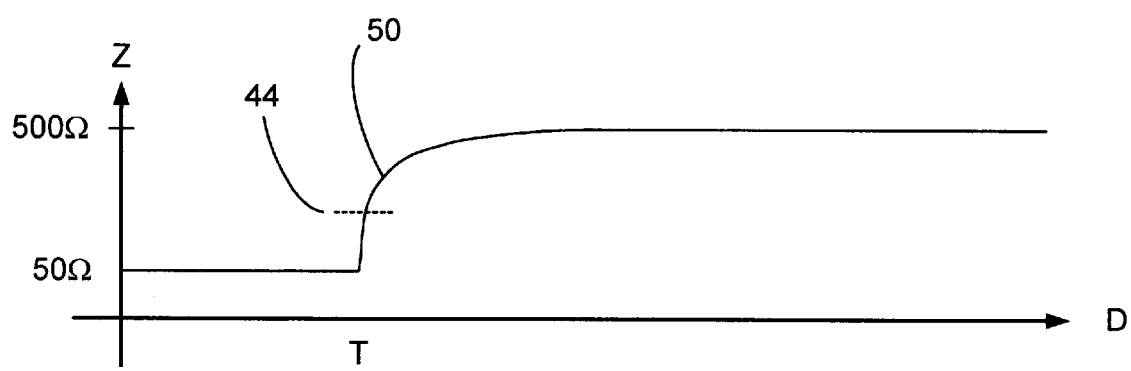
FIG. 2b is a plot of impedance versus distance for a wire horn and single wire line.

FIG. 2b plots impedance Z versus distance D and has a one-to-one distance correspondence with FIG. 2a along the horizontal axis. The following description relates to both FIGS. 2a and 2b. Coaxial cable 32 has a nominal impedance of 50Ω. There is a sharp impedance discontinuity 44 at point T (see FIG. 2b). (The impedance then nreases to 500Ω.) The mounting location 42 of the horn wires 38 relative to the dipstick rod or wire 36 defines the impedance at location T, which is a reference location designating the top of the tank. Thus the magnitude of discontinuity 44 can be scaled as a matter of design choice. For very small discontinuities, such as a transition from 50Ω to 60Ω, for example, it may be necessary to broaden the wires into a triangular shape (or open leaf) 46. In principle, any number of wires may be used, but four wires are preferred.

Impedance Z versus distance D smoothly increases as seen at curve 50 In FIG. 2b. This smoothness is needed to avoid any potential confusion with a discontinuity produced by a low dielectric constant material. As shown in FIG. 2a, wires 38 can have a flare 48 at the ends (even bending back 180°) to improve the smoothness of the transition to the high (500Ω) impedance of the line 36. Experiments show that the exact angle 52 that the wires make to the dipstick rod are not critical, nor is the precise shape of the flare 48. The length of the wires 38 should be several times the effective physical length of the pulse being propagated.

If wires 38 are made of a flexible material, e.g., brass, steel, or metallized plastic, they can be temporarily bent inwards as indicated by arrow 54 during installation to enable use with a small tank opening.

Figure 3A:
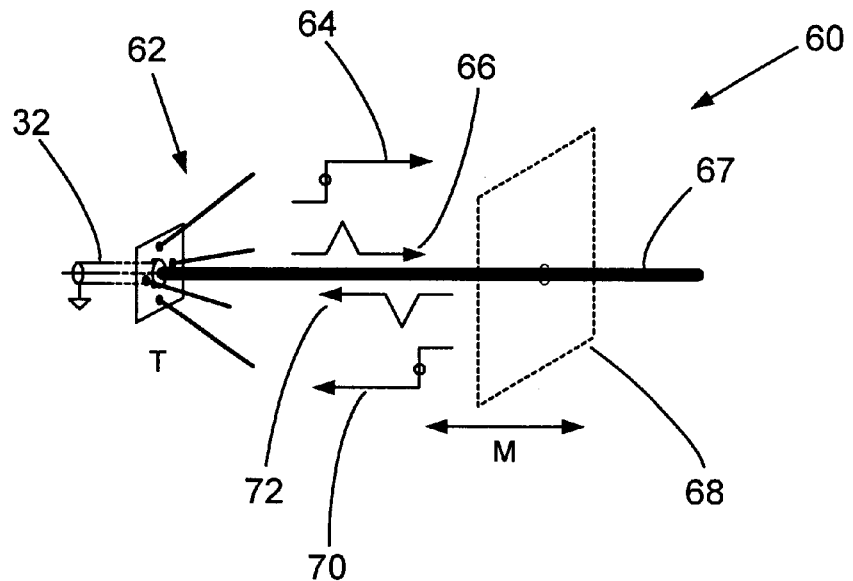
FIG. 3a shows forward and reflected step pulses and, alternatively, impulses, on a single wire line with a wire horn and with a reflector such as a material or a movable component.

FIG. 3a shows the dipstick 60 in combination with a moveable target (or reflector) 68. Launcher horn 62, connected to coaxial cable 32, launches either step-like pulses 64 or impulses 66 down line 67 towards a reflector (target) 68 that is movable and generally represents a material level M or a point of contact in a linear displacement transducer application. Step-like pulses 70 or impulses 72 are reflected from the reflector (target) 68 and appear inverted since the material is always a lower impedance than the free-space between the horn and the material.

Figure 3B:
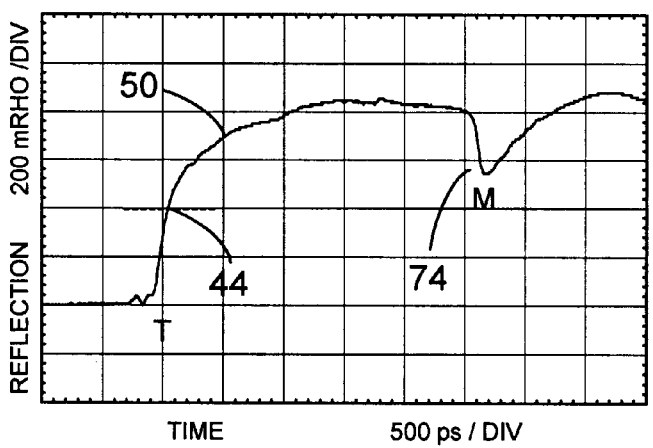

FIG. 3b is a reflection plot of an embodiment of FIG. 3a. The vertical scale is expressed in milli-rho, a measure of the reflection coefficient to a step-like pulse propagating along cable 32. A sharp rise in reflection is seen at point 44 (location T) that smoothly tapers along curve 50 to about 850 milli-rho, representing an impedance Z of ~500Ω. A reflection 74 is seen at location M due to the presence of reflector 68.

Figure 3C:
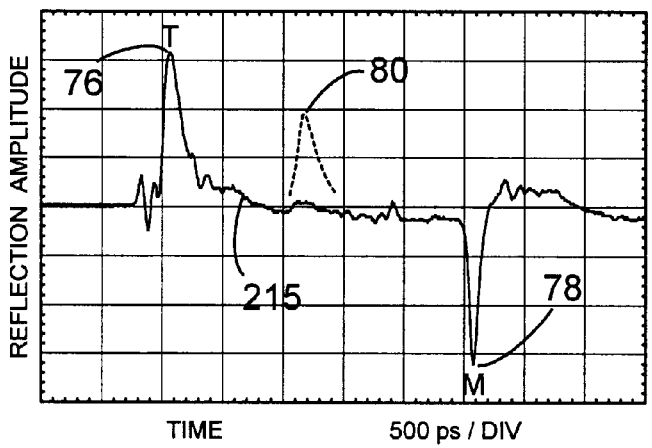
FIG. 3c is a differentiated version of FIG. 3b, as would occur with impulses or with a differentiator in the TDR system.

FIG. 3c is a differentiated version of the waveform of FIG. 3b. Approximately equal amplitude pulses 76, 78 can be seen at locations T and M, respectively. As will be discussed shortly, the time of peak of these pulses will be detected and the difference in their occurrence times will be used as a measure of position M relative to T.

A spurious pulse 80 was added to the data plotted in FIG. 3c to indicate an aberration that might be produced by a solid horn launcher as seen in the prior art, such as in the aforementioned Ross apparatus, whereby the rim of the horn exhibits a sharp impedance discontinuity with free-space. A solid horn is not sufficiently airy compared to a wire horn, and a smooth transition to free-space is nearly impossible. The resulting spurious pulse 80 may false trigger the TDR or create a very large measurement error when M is moved closer to T so its reflection coincides with pulse 80.

Figure 4:
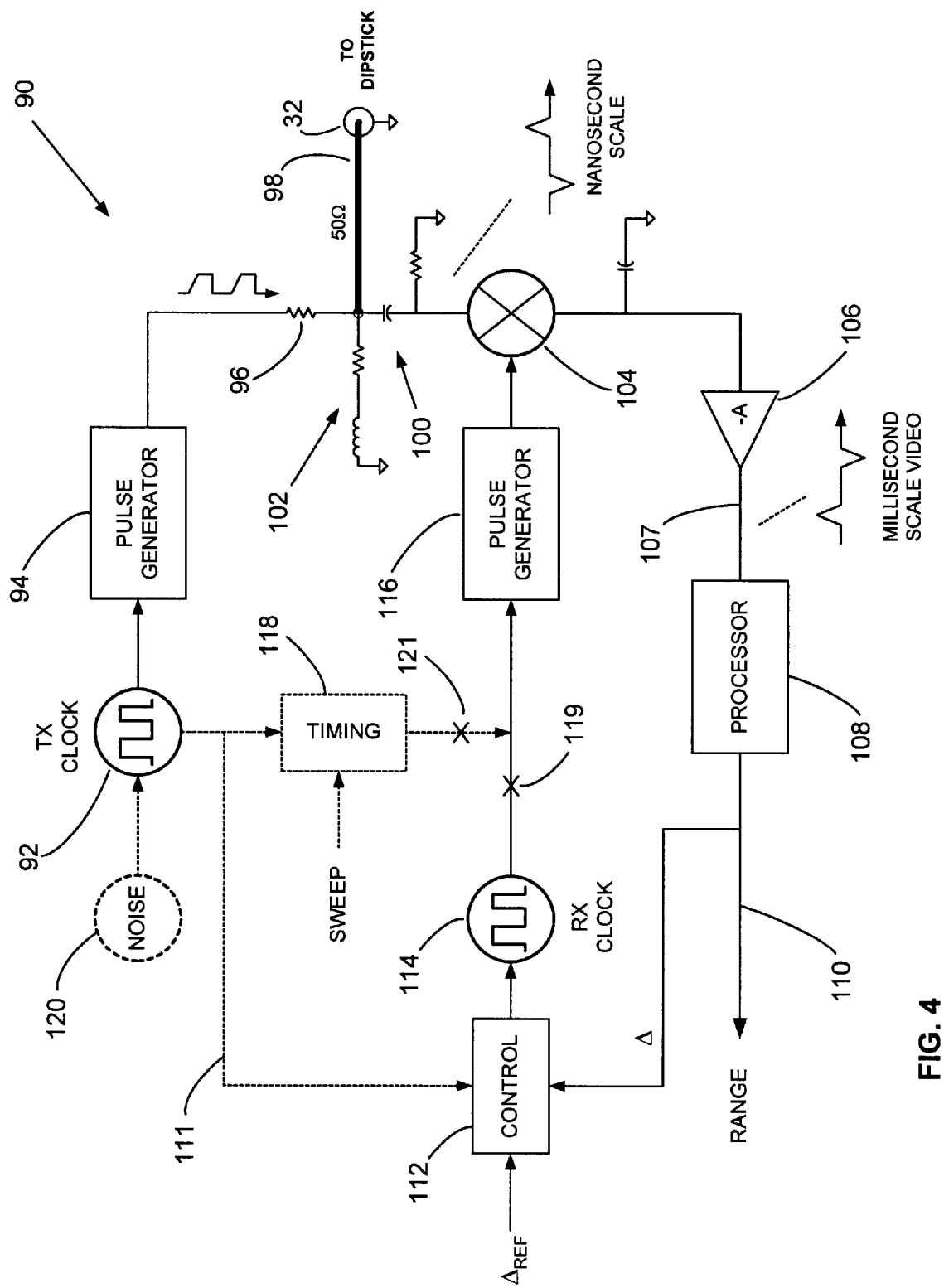
FIG. 4 is a block diagram of a TDR system of the present invention.

FIG. 4 is a diagram of a TDR system 90 of the present invention. To simplify signal processing and to make the entire system practical, the present invention employs expanded time techniques, also known as equivalent time (ET). ET is a beat-frequency effect produced by sampling reflections at a slightly slower rate than the transmitted pulse rate. The net effect is very similar to shining a strobe light on a fan blade, and adjusting the strobe frequency so the blade appears to rotate very slowly. By this analogy, the rapidly rotating fan blade represents the realtime pulses travelling at the speed of light, the strobe is an electronic gate in the receiver (or the gated sampler described herein), and the slowly rotating visual effect is the expanded time millisecond-scale video output 107. "Video" is used here in the common radar parlance, and is not to be confused with television or visual signals.

An ET pulse-echo TDR system transmits pulses, and after a delay its receiver, i.e., its sampler, is gated at a particular point in time, or equivalently, in range. The timing of the gate is typically swept across a range of delays (e.g., 0–100 ns) in a matter of milliseconds, such that the sampler video output is a scan-like waveform which replicates events occurring on a realtime 0–100 ns scale on an equivalent time millisecond-scale. Equivalent time techniques are commonly used in wideband sampling oscilloscopes and will not be dwelt upon here.

TX CLOCK 92 in FIG. 4, e.g. a first crystal oscillator, typically operates at 4-megaHertz and triggers pulse generator 94 to produce a squarewave with a fast edge. Optionally, the TX CLOCK can be noise modulated in frequency by noise source 120 to spread the spectrum of the small amount of leakage radiation from the dipstick. The TDR squarewave passes through attenuator resistor 96 and therefrom propagates down microstrip 98 to the dipstick via coaxial cable 32. Optionally, cable 32 and/or microstrip 98 can be omitted as a design choice, i.e. either cable 32 or the dipstick itself can be directly connected to resistor 96.

Reflections from the dipstick pass through differentiation network (differentiator) 100 to high-speed sampler 104, which is gated by pulse generator 116 with controlled timing. The sampler output is amplified by amplifier 106 of gain -A to produce a video output signal 107 which is processed by processor 108 to produce a reflection range indication signal 110.

Reflections returning from the dipstick generally must be well-terminated to prevent unwanted triple-transit reflections or pulse "rattles". Since resistor 96 is typically 470Ω, and since the differentiation network 100 is typically comprised of a 56Ω resistor and a 1 pF capacitor, a true 50Ω termination does not exist by virtue of their combination. Thus, reactive termination network 102 with a 56Ω resistor and a 3 nH inductor has been added to form a real, i.e., non-reactive, 50Ω termination. In order to maintain a non-reactive 50Ω termination, the time constants of networks 100 and 102 must be the same, or about 56 ps in this example.

RX CLOCK 114 is typically a second crystal oscillator set to 4 MHz-Δ, where 4 MHz is the frequency of the first oscillator (TX CLOCK) and where Δ is a small offset, typically 25 Hz, from the TX CLOCK. Thus, the RX CLOCK smoothly slips 360° in phase 25 times per second and thus produces a slow, linear time scan of the reflection pulses present at sampler 104. A control circuit 112 compares the frequency Δ of the range signal on line 110 (typically a PWM pulse) to a reference frequency $\Delta_{ref}$ and controls RX CLOCK 114 to maintain a precise 25 Hz offset from 4 MHz. Alternatively, control circuit 112 may directly compare the TX and RX CLOCKs via line 111 to regulate the offset Δ. This method is less-preferred since it introduces the TX CLOCK to the RX CLOCK side of the system, raising the possibility of phase contamination and subsequent nonlinear phase slippage.

In another clock architecture, the RX CLOCK may operate with a crystal operating at a harmonic of the TX CLOCK plus a small offset Δ, and when combined with a pulse selector circuit, a limited-range sweep can be obtained, such as from 0 to 36°. Dual crystal timing systems are described in co-pending application "Self Locking Dual Frequency Clock System", Ser. No. 09/282,947, by McEwan, and "Precision Radar Timebase Using Harmonically Related Offset Oscillators", U.S. Pat. No. 6,072,427, by McEwan.

Yet another timing method is obtained by disconnecting and removing the RX CLOCK, as indicated by "X" 119, and installing a swept timing system, as indicated by connecting the line passing through "X" 121. In this case timing circuit 118 is swept across a range of delays by a sweep input, typically an analog voltage ramp. The timing sweep usually repeats at a 25 Hz rate and sweeps over a 0–100 ns delay relative to the TX CLOCK to produce an equivalent time video signal of the reflected pulses. Swept timing circuits having scale factor accuracies on the order of several tens of picoseconds or better can be realized with a Delay Locked Loop (DLL) such as a "Precision Digital Pulse Phase Generator" as disclosed by McEwan in U.S. Pat. No. 5,563, 605, or in copending application, "Phase-Comparator-Less Delay Locked Loop", Ser. No. 09/084,541, now U.S. Pat. No. 6,055,287, by McEwan.

Figure 5A:
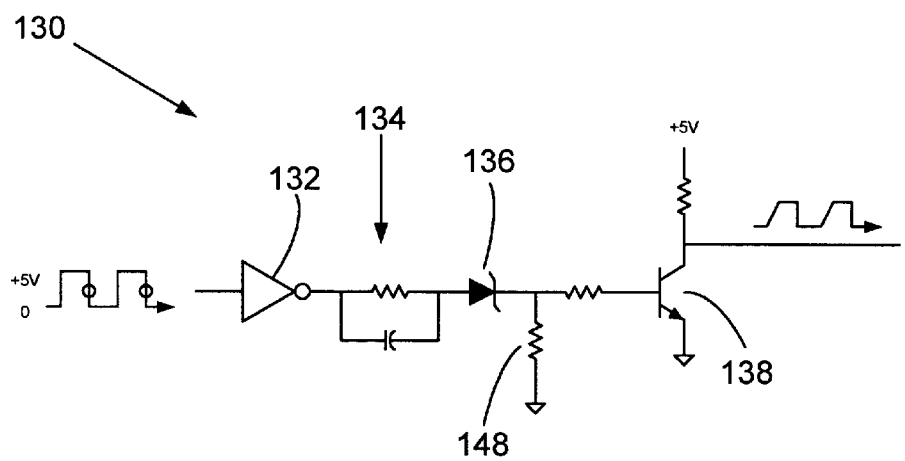
FIG. 5a is a schematic diagram of a low aberration transmit pulse generator.
Figure 5B:
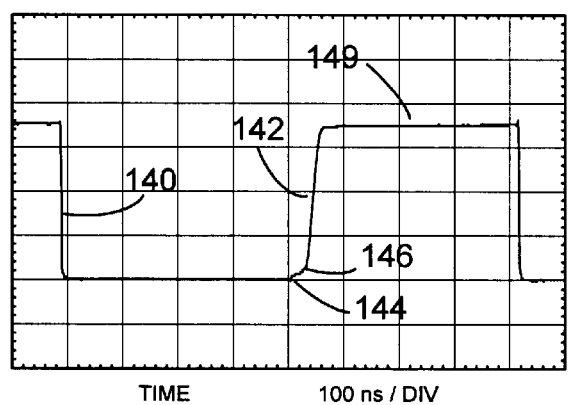
FIG. 5b is a waveform generated by the circuit of FIG. 5a at 100 ns/DIV.
Figure 5C:
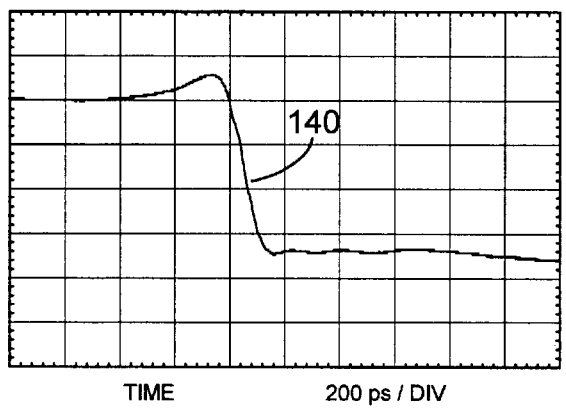
FIG. 5c is a waveform generated by the circuit of FIG. 5a at 200 ps/DIV.

FIG. 5a is a schematic diagram of a low aberration transmit pulse generator 130. A logic inverter 132 is coupled through a drive network 134 and diode 136 to a switch transistor 138. When the inverter swings positive the transistor is rapidly biased on and generates a very fast negative-going transition 140, as seen in FIG. 5b and on an expanded scale in FIG. 5c. The transition time is 0.1 ns.

When the output of inverter 132 swings low, diode 136 ceases to conduct, but transistor 138 continues to conduct for a short period due to a saturation delay. This saturation delay is used advantageously to eliminate a feed-through spike from the logic inverter. In other words, the transistor's collector remains clamped to ground at 144 in FIG. 5b while its base drive swings low. The transistor finally pulls out of saturation at 146 and its collector returns to its high state 149 at a relatively slow rate 142 determined to a large extent by base bias resistor 148 (see FIG. 5a). The slow risetime results in very little signal getting past the TDR differentiator 100.

In TDR circuits such as disclosed herein, it is generally important to avoid coupling glitches onto the line since they may distort the reflections from the material being sensed. After differentiation, seemingly minor glitches are greatly magnified; a glitch-free transmit waveform is essential. Accordingly, the circuit of FIG. 5a provides one fast edge for reflectometry and a 100× slower edge during return-to-zero.

Figure 6:
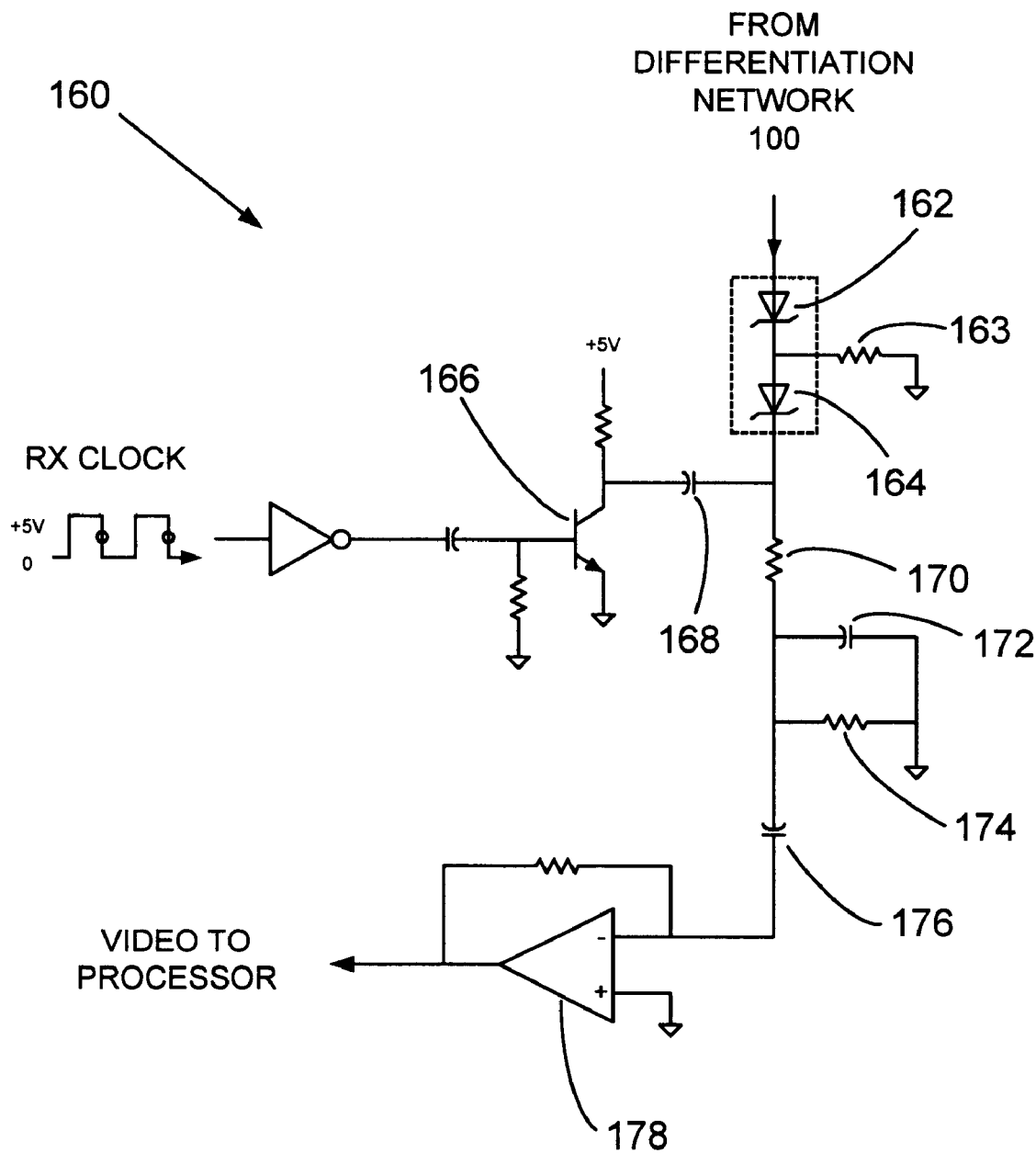
FIG. 6 is a schematic diagram of a high-speed sampler and video amplifier.

FIG. 6 is a schematic diagram of a high-speed sampler and video amplifier circuit 160. Diodes 162, 164 comprise high speed sampling diodes in a sampling circuit that further includes switching transistor 166, sampling capacitor 168, charge transfer resistor 170, charge holding capacitor 172, bias resistor 174, coupling capacitor 176 and op amp 178. Except for diode 162 and resistor 163, this circuit has been fully described in co-pending application "Charge Transfer Wideband Sample-Hold Circuit" Ser. No. 09/084,502, now U.S. Pat. No. 6,060,915, by McEwan, and will not be expanded upon here.

The series combination of diodes 162 and 164 results in one-half the input capacitance of a single diode sampling circuit and thus presents less reactive loading to the TDR line and therefore a better termination for reflected pulses. Resistor 163 is situated between diodes 162, 164 to shunt glitches from blowing by transistor 166 through capacitor 168 and diodes 162, 164 and onto the dipstick. These blowby components are generally in the form of digital logic glitches that can couple through the diodes 162, 164 and appear on the dipstick line as spurious pulses. Hence, resistor 163 provides a shunt path to ground to substantially reduce this effect.

Figure 7A:
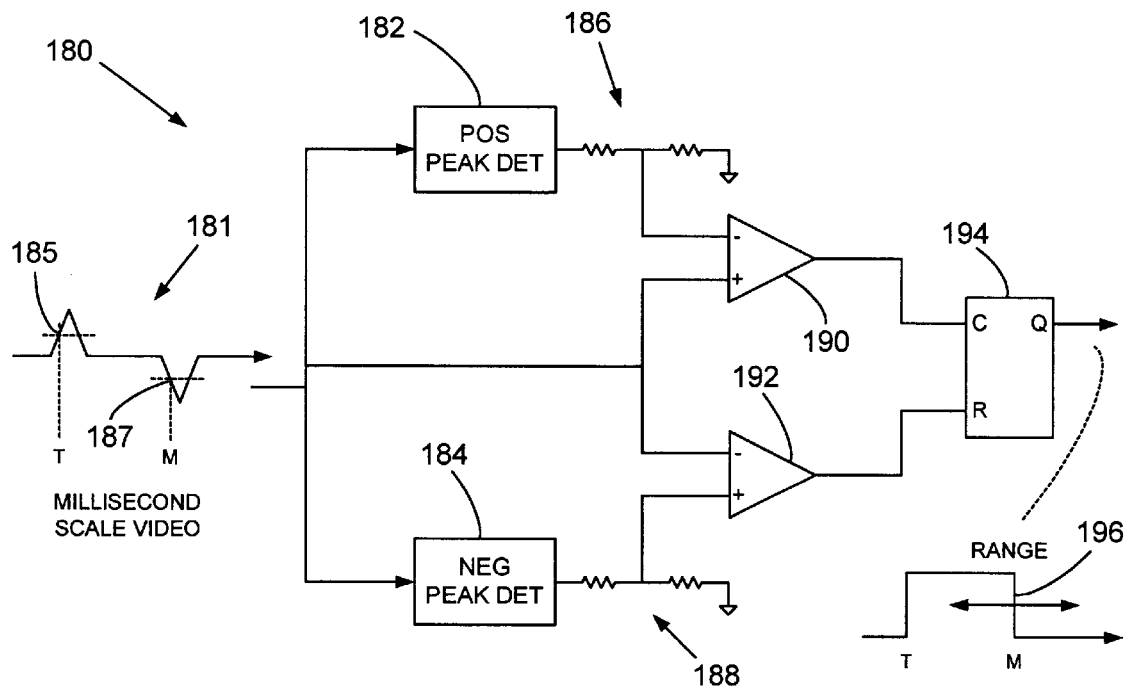
FIG. 7a is a block diagram of a prior art CFD-type automatic pulse detector.

FIG. 7a is a block diagram of a prior art constant fraction discriminator (CFD) automatic pulse detector 180. Positive peak detector 182 and negative peak detector 184 detect the peak values of repetitive TDR pulses 181 (only one repetition of a 25 Hertz repetition rate is shown for clarity). The outputs of the peak detectors are multiplied by a constant (~0.5) via voltage divider networks 186, 188 respectively, and are then applied as threshold levels to respective comparators 190, 192. Whenever the input pulse amplitude, which is applied to the other input of each comparator 190, 192, exceeds either the positive or negative threshold, the respective comparator triggers a flip-flop 194 to generate a range PWM (pulse width modulation) pulse. The width of the PWM pulse varies with the position of edge 196 and indicates the time difference between the T and the M reflections, or equivalently the fill level of the tank. The scale factor of the PWM pulse is typically 1 us=1 mm. Most importantly, if the pulse amplitude doubles, so will the peak detector outputs and their corresponding threshold levels. Consequently, the exact trigger points, 185, 187, as a percentage of peak amplitude, remain constant.

The CFD circuit works well in tracking pulse amplitude variations under ideal conditions. If the pulse amplitude varies rapidly, as may be the case with sloshing materials, the peak detectors will not track rapid decreases in amplitude, since they generally have a fast attack and a slow decay characteristic (~1-second time constant). Thus, the CFD is unsuitable for all mobile applications, including automotive, aircraft and marine use. A further problem with the CFD is low frequency aberrations such as ringing and baseline tilt that can cause substantial errors. Finally, the CFD of FIG. 7a is incomplete; some means of thresholding is needed for the case when there is no reflected pulse and the CFD false triggers on baseline noise.

Figure 7B:
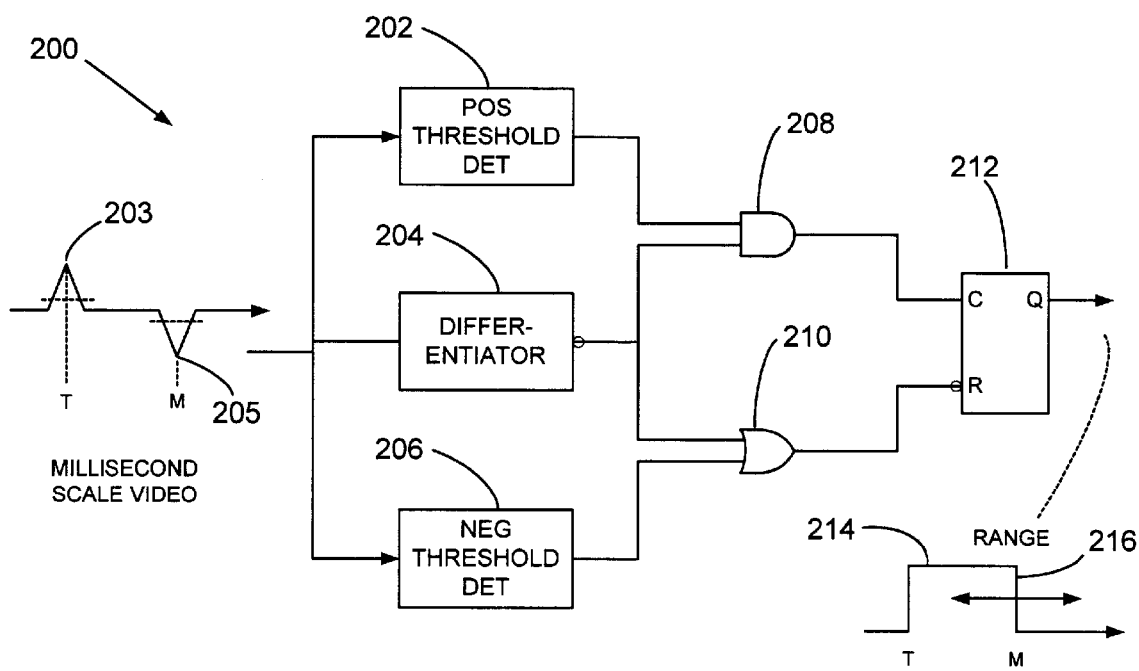
FIG. 7b is a block diagram of a time-of-peak (TOP) detector of the present invention.

FIG. 7b is a block diagram of a time-of-peak (TOP) detector 200 of the present invention. A TOP detector generally detects the occurrence of the peak of a pulse by differentiating the pulse and detecting when a zero axis crossing occurs. Thus the TOP detector 200 has a differentiator 204 coupled through logic gates 208, 210 to flip-flop 212 to generate a PWM high level 214 when the slope of the input pulse first goes negative at T or point 203 on the video waveform, and then the PWM pulse flips low at M (edge 216) on the PWM pulse or corresponding point 205 on the video waveform. The width of the PWM pulse thereby indicates the T–M time difference, or equivalently the tank fill level.

In the absence of input pulses, differentiator 204 generates a high level of random noise at its output. Positive and negative threshold detectors 202 and 206 have been added to eliminate this problem. The output of the threshold detectors change state whenever the input pulses 203, 205 exceed predetermined levels (incorporated within the functional blocks), and enable respective gates 208, 210. One gate is shown as an AND gate 208 and the other as an OR gate 210 to suit the specific logic requirements of flip-flip 212.

For any pulse above threshold, its time-of-peak detection is independent of pulse amplitude. TOP detection is also very much independent of baseline tilt, as evidenced, for example, at point 215 of FIG. 3c. Unlike the CFD, the TOP detector has no analog memory and can respond to rapid changes in pulse amplitude; it is ideal for sloshing liquids.

Figure 8:
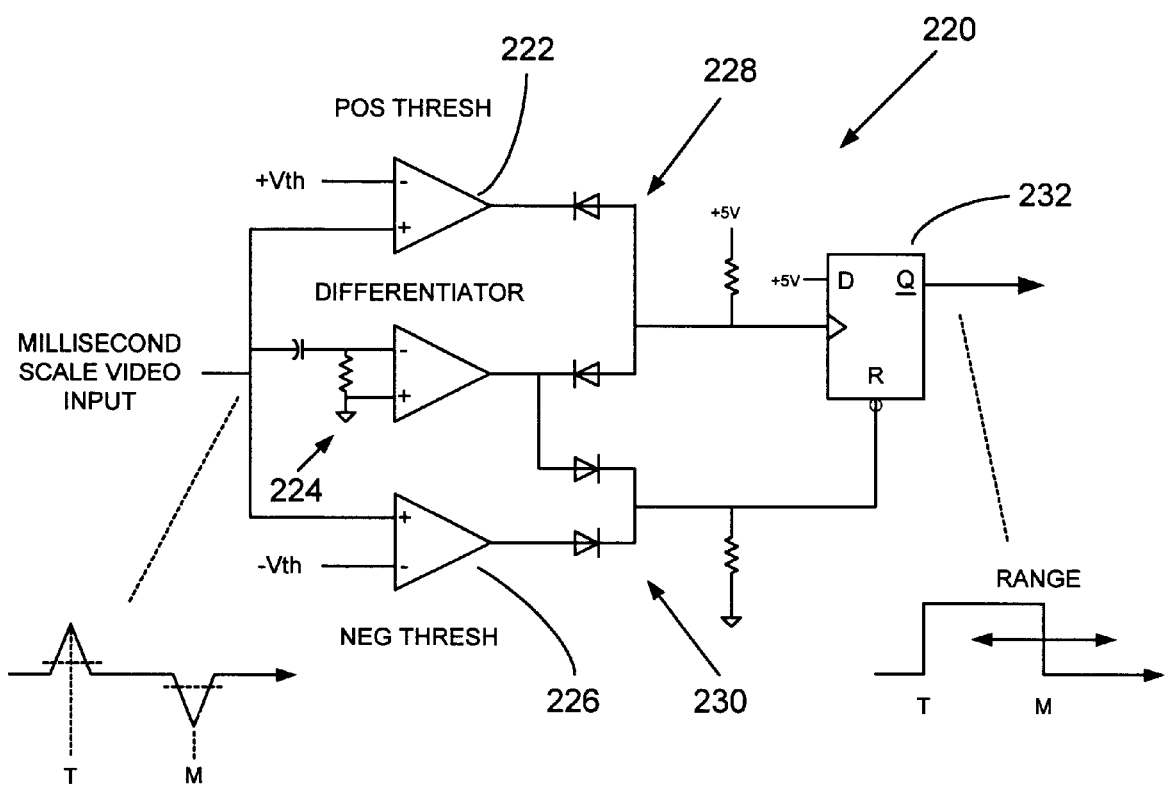
FIG. 8 is a schematic diagram of a time-of-peak (TOP) detector.

FIG. 8 is a schematic diagram of the time-of-peak (TOP) detector 220 of FIG. 7b. Positive and negative threshold detectors 222, 226 and differentiator 224 are based on op amps, and logic AND and OR functions are performed by diode pairs 228, and 230 respectively. Flip-flop 232 is a D-input type 74HC74. The op amps are TI type TLO74 and the diodes are 1N4148s. The inputs +Vth and −Vth are the threshold voltages applied to threshold detectors 222, 226 respectively.

Figure 9:
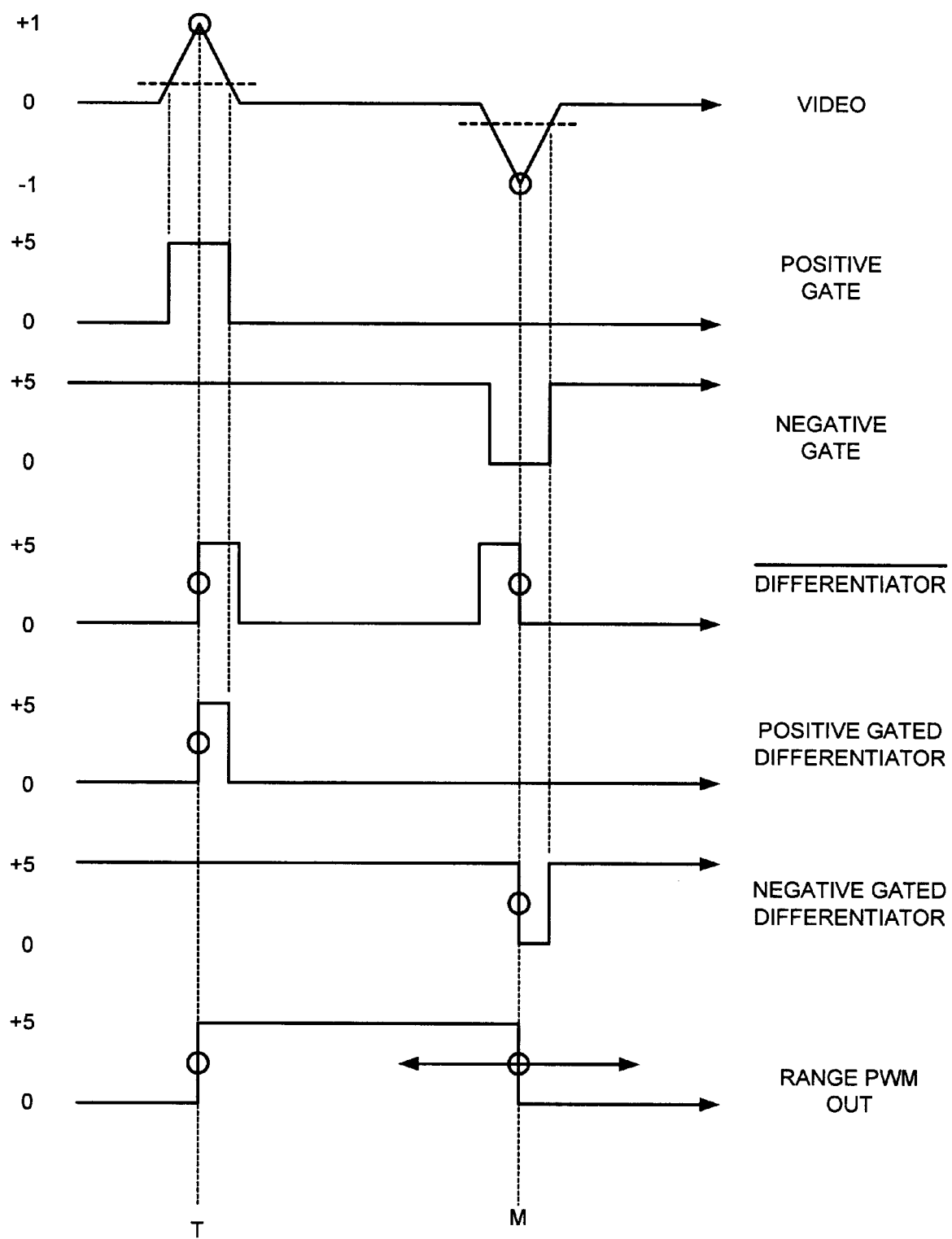
FIG. 9 is a timing diagram of the TDR system of FIG. 4.

FIG. 9 is a timing diagram of the TDR system of FIG. 4 and the TOP detector of FIG. 7b. Equivalent time TDR pulses are labeled VIDEO and generate positive and negative threshold pulses labeled POSITIVE GATE and NEGATIVE GATE via threshold detectors 202, 206. The differentiator 204 generates the DIFFERENTIATOR-bar waveform. These waveforms are gated by gates 208, 210 to produce POSITIVE GATED DIFFERENTIATOR and NEGATIVE GATED DIFFERENTIATOR pulses that toggle flip-flop 212 to produce the RANGE PWM OUT pulse, indicating material fill level. The circles on the waveforms indicate the TOP trigger points. Note that the gate waveforms simply enable the DIFFERENTIATOR-bar pulses but have no impact on the actual timing measurement.

Although the invention has been described with reference to a single wire (or Goubau line) dipstick, the principles of the timing circuitry, the TDR reactive termination and differentiator, the sampler and the TOP detector apply to other TDR embodiments as well, such as a coaxial line and 2-wire dipstick.

Changes and modifications in the specifically described embodiments can be carried out without departing from the scope of the invention which is intended to be limited only by the scope of the appended claims.

What is claimed is:

1. A method for coupling a pulse onto a guide wire and producing a controlled marker reflection, comprising:

producing a step impedance discontinuity at a mounting location of the guide wire to produce a marker reflection, smoothly tapering the impedance from the step discontinuity to the impedance of the guide wire to efficiently couple a pulse onto the guide wire.

2. A guide wire launcher for launching electromagnetic pulses onto a guide wire, comprising a horn formed of a plurality of wires or open leaves mounted about the guide wire and having an abrupt impedance discontinuity at the mounting location to generate a controlled marker reflection.

3. The guide wire launcher of claim 2 wherein the wires or open leaves are flexible.

4. The guide wire launcher of claim 2 wherein the wires or open leaves are flared.

5. The guide wire launcher of claim 2 wherein the horn is formed of said plurality of wires or open leaves having a smooth impedance taper to a Goubau line impedance.

* * * * *